United States Patent [19]

Jhaveri et al.

[11] 4,401,569
[45] Aug. 30, 1983

[54] METHOD AND APPARATUS FOR TREATING HYDROCARBON AND HALOGENATED HYDROCARBON CONTAMINATED GROUND AND GROUND WATER

[75] Inventors: Vidyut Jhaveri, Highland Mills, N.Y.; Alfred J. Mazzacca, Rutherford; Harold Snyder, Cliffside Park, both of N.J.

[73] Assignee: Groundwater Decontamination Systems, Inc., Waldwick, N.J.

[21] Appl. No.: 281,773

[22] Filed: Jul. 9, 1981

[51] Int. Cl.³ .................... C02F 3/00; C10G 32/00
[52] U.S. Cl. .................... 210/610; 210/622; 210/747; 210/170; 210/901; 405/128; 435/262; 435/281; 166/246
[58] Field of Search .................... 405/128, 129, 36; 210/610, 611, 747, 170, 617, 622, 901, 908; 435/281, 262; 166/246

[56] References Cited

U.S. PATENT DOCUMENTS 3,846,290 11/1974 Raymond .................... 210/610
3,995,436 12/1976 Diggs .................... 405/128
4,167,973 9/1979 Forte et al. .................... 210/908
4,288,174 9/1981 Laws .................... 405/129

Primary Examiner—Benoit Castel
Attorney, Agent, or Firm—Finnegan, Henderson, Farabow, Garrett & Dunner

[57] ABSTRACT

A method and apparatus for treating ground and ground water contaminated with hydrocarbon and halogenated hydrocarbon compounds. Treatment of contaminated water removed from the ground is accomplished by microorganisms which consume the contaminants. Growth of microorganisms is enhanced under controlled conditions by addition of nutrients and gases such as oxygen, nitrogen, carbon dioxide or a combination of these and other gases to the contaminated water. Treated water carrying microorganisms, nutrients and gases is returned for recirculation through the contaminated area of ground to leach out and biodegrade the contaminants deposited in the ground. Microorganism activity is also enhanced in the ground by injection of nutrients and oxygen or other gases into the ground and ground water in the contaminated area.

32 Claims, 4 Drawing Figures

METHOD AND APPARATUS FOR TREATING HYDROCARBON AND HALOGENATED HYDROCARBON CONTAMINATED GROUND AND GROUND WATER

BACKGROUND OF THE INVENTION

The present invention relates to a method and apparatus for treating water and the ground which has been contaminated by hydrocarbon and halogenated hydrocarbon materials. The treatment of the contaminated ground water is accomplished by microorganisms which can biodegrade the hydrocarbon and halogenated hydrocarbon contaminants. The treatment takes place both in situ and outside of the earth in containment areas. The term "hydrocarbon" for the purpose of this application is intended to include halogenated hydrocarbons.

In cases where there are spills of hydrocarbon material into or onto the ground, the materials will contaminate the surrounding ground water through action of the natural movement of water through the ground. If the spills are not isolated and the material somehow removed, the contaminants will spread beyond the original spill area through the ground water system thereby endangering water supplies. In order to avoid this result, the contaminated material must be removed. However, few options are available to remove it. In some cases, physical removal and disposal or treatment of the soil is required. Alternatively, the spill site may be isolated to a depth below which the spill traveled via ground water action, and the contaminants retained in this area of ground isolated from surrounding areas. However, these methods are exceedingly expensive and do not eliminate the contaminants but transfer them from one site to another.

An alternative method usable in some areas where soil and climate conditions permit is to encourage the growth of natural microorganisms in the soil and ground water which are capable of biodegrading the particular hydrocarbon contaminant spilled. To some extent, the growth of the appropriate microorganisms occurs naturally when the feedstock (the spilled hydrocarbon materials) is available. It has also been shown that by increasing the presence of certain nutrients and the oxygen level in the water flowing through contaminated soil, the biodegradation process will advance more rapidly. One such process is shown in U.S. Pat. No. 3,846,290 issued Nov. 5, 1974, which teaches the addition of nutrients and oxygen to contaminated ground water. A disadvantage of this process is that the contaminants are not completely removed. Therefore, in order to avoid contamination of the surrounding area, the polluted ground water must be pumped from the ground and disposed of. This is a serious and expensive problem, since large quantities of ground water are being treated and have very dilute concentrations of contaminants. Moreover, the process is very slow because the biodegradation takes place throughout a large volume of soil. In addition, the biodegradation process is limited by the ambient conditions, e.g., temperature of the ground water and the amount of nutrients and oxygen which can filter through the affected soil. The soil structure and the natural rate of movement of water through the soil can retard biological activity and increase tremendously the amount of time taken to effectively treat contaminants in the ground.

Therefore, there is a need for a method to isolate a hydrocarbon spill to biodegrade the hydrocarbon contaminants adequately and inexpensively and to dispose of the contaminants without merely removing them by flushing the soil and disposing of them outside of the immediate spill area.

SUMMARY OF THE INVENTION

The present invention overcomes the disadvantages of the prior art by removing ground water from hydrocarbon contaminated areas, treating it with microorganisms, nutrients and gases such as oxygen, nitrogen, carbon dioxide or a combination of these and other gases to accomplish a more rapid biodegradation of the hydrocarbon material and then returning the treated water containing microorganisms, nutrients and gases to the contaminated area to be recirculated through the contaminated ground. It is also desirable to treat the contaminated ground area by adding nutrients and oxygen, and/or other gases, to the returning treated water to increase the biodegradation process in situ. In this manner, the water containing contaminated material is re-used rather than removed and disposed of off-site and the contamination in the soil and the ground water is reduced through continual biodegradation by the microorganisms which feed on the hydrocarbon compounds.

Additional objects of this invention are to treat a variety of different hydrocarbon contaminants which have varying degradation rates by use of microorganisms in an environment which can be more closely monitored than is the case where biodegradation takes place only in the ground. It is a further object to provide a process where the contaminated ground water can be retained for biostimulation treatment for controlled amounts of time to allow for treatment to reduce the level of hydrocarbon contaminants before returning it to the ground system. It is also an object of this invention to provide a less expensive means to eliminate contamination hazards to ground water supplies.

To achieve the objects and in accordance with the purpose of the invention, as embodied and broadly described herein, the method of treating hydrocarbon contaminated ground water and ground to reduce the level of contamination comprises: (1) removing the contaminated ground water from a location proximate and down gradient of the ground water flow through an area of ground containing hydrocarbon contamination, (2) adding nutrients and oxygen or other gases by aeration to the removed ground water, the nutrients and gases being suitable for enhancing growth of hydrocarbon consuming microorganisms and continuing the aeration to drive the biodegradation process, (3) recycling of the microorganisms and removal of the sediment from the treated water after the microorganisms have proceeded to substantially degrade the contaminants, (4) returning the treated water containing nutrients, microorganisms and gases to an area of contaminated ground at a position up gradient of the water flow through the contaminated area of ground by natural or directed percolation toward a removal location and (5) adding air or other gases into the ground water to enhance the growth of microorganisms in the contaminated ground and ground water. This process should be continued until the level of hydrocarbon contamination in the ground and ground water is eliminated or reaches an acceptable level.

This method is carried out by apparatus which comprises means for removing ground water from an area of ground which is contaminated by hydrocarbon compounds, the means being capable of extracting substantially all water flowing through the contaminated area of ground, means for treating the removed water with nutrients and oxygen, or other gases, to increase the amount of activity by microorganisms to biodegrade the hydrocarbon materials, means for recycling microorganisms from the treated water, means for adding nutrients and oxygen or other gases to the treated water and means for reinjecting the treated water containing nutrients, microorganisms, and gases into the ground at a location proximate and upgradient of ground water flow through the contaminated area of ground, the reinjection location chosen so that the treated water containing nutrients, microorganisms and gases flows by natural or directed ground water flow toward the removal means.

The accompanying drawings, which are incorporated in and constitute a part of this specification, illustrate one embodiment of the invention and together with the description serve to explain the principles of the invention.

BRIEF DESCRIPTION OF THE PREFERRED EMBODIMENT

Reference will now be made in detail to the present preferred embodiment of the invention, an example of which is illustrated in the accompanying drawings.

Figure 1:
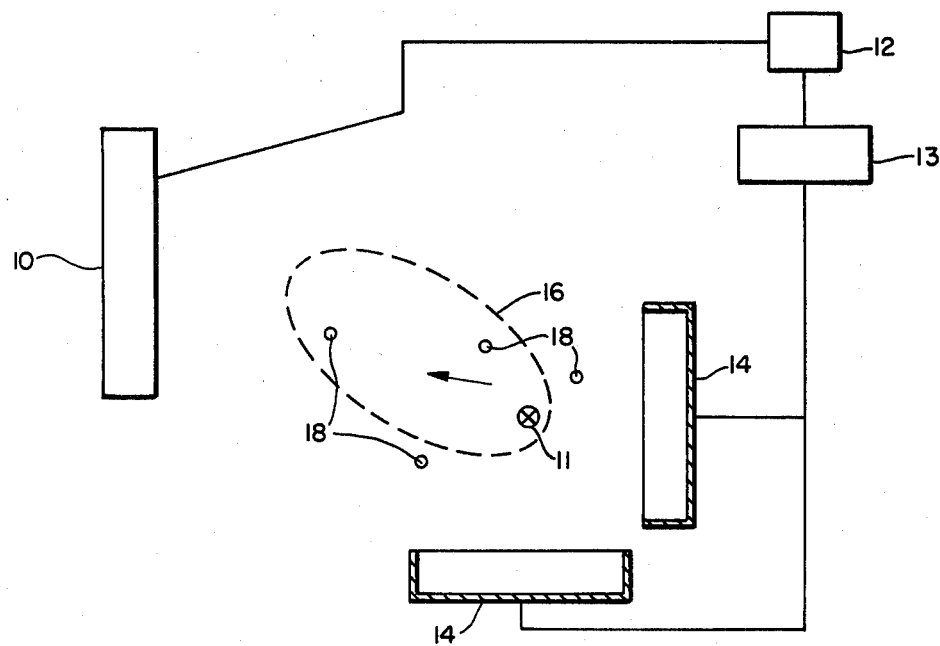
FIG. 1 is a schematic depiction of injection trenches, ground water flow and a dewatering trench constructed in accordance with the present invention.
Figure 2:
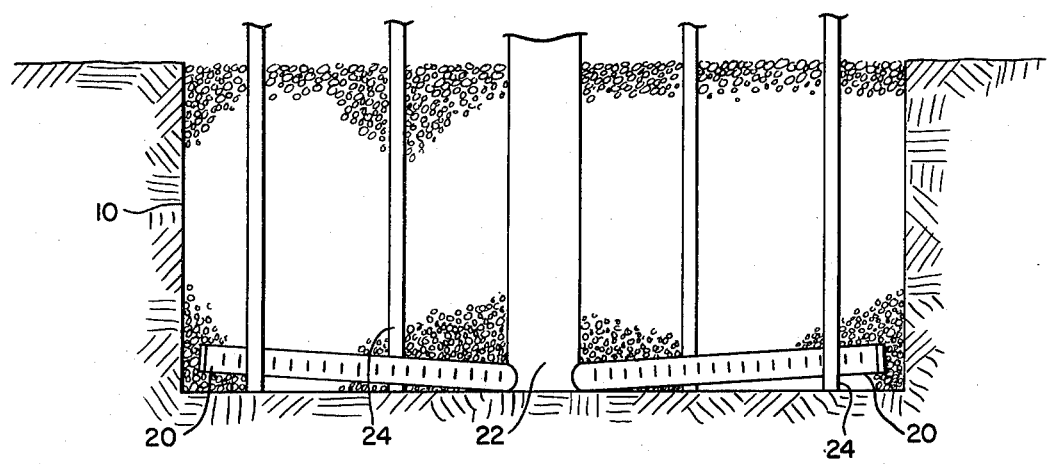
FIG. 2 is a cross-sectional view of a dewatering trench.

The preferred embodiment of the method for treating hydrocarbon contaminated ground water comprises removal of the contaminated water from a dewatering trench 10 as shown in FIG. 1 which is dimensioned and positioned to remove substantially all of the water flowing through the area of ground 16 which contains the hydrocarbon contamination. In areas of a spill 11 where the natural water-table elevations and ground water flow patterns can be determined, the water passing through the site can be effectively isolated and removed through a trench or series of trenches such as dewatering trench 10. Dewatering is accomplished by pumping water from a well connected to dewatering pipes such as shown in the cross section of a dewatering trench 10 in FIG. 2 where 20 indicates capped drainpipes at a low level in the trench feeding a central dewatering well 22. Such a dewatering system is used to remove substantially all of the water flowing into the trench from the contaminated site. Dewatering well points 24 are used in conjunction with the dewatering system to remove water samples for monitoring and can also be used to aid in dewatering the trench. The length, depth and width of the dewatering trench is chosen to accommodate the dynamics of the site. A pumping system to remove contaminated ground water from the well points 24 and dewatering well 22 may be connected by a common header system (not shown) and operated by an automatic water level monitoring system which activates a pump when the water level in the trench rises to a predetermined level. The contaminated ground water pumped from the dewatering trench is piped to a holding tank 12 or contaminated water treatment system 13.

It is known that in most shallow ground waters, an indigenous population of bacteria carries on a low level of biological activity on biodegradeable compounds. The rate of degradation of the compounds can be increased manyfold in situ by providing optimum growth conditions for these naturally occuring bacteria. Such optimization is usually accomplished by increasing oxygen, nitrogen and phosphorous concentrations in the groundwater system. In some contaminated groundwater, it is also necessary to add trace inorganic salts of iron, magnesium, and manganese.

In addition to providing the conditions for a more rapid biodegradation process to take place in situ, the contaminated water removed from the dewatering trench 10 is, according to the invention, subjected to a biostimulation process outside of the earth to optimize the degradation process. In order to successfully operate the external biostimulation process, it is necessary to determine the exact nutrient requirements for the microorganisms to achieve maximum biodegradation of the hydrocarbon compounds involved. The microorganisms used in the biostimulation process can be either those naturally occuring in the contamination site or others specifically chosen to consume the hydrocarbons known to be present in the contaminated ground including mutated microorganisms. It is also possible to use a combination of microorganisms native to the site or others introduced in order to effectively treat all of the contaminants present.

Mixing the removed contaminated ground water with nutrients in a separate containment area such as a pond or a tank or other enclosed vessel external to the ground water system under controlled conditions increases the bacteria count manyfold, thus accelerating the biodegradation process. Nutrients added are materials such as ammonium chloride, sodium phosphate, magnesium sulphate, sodium carbonate, iron sulphate, calcium chloride, and other nutrients which acceleate the biodegradation process.

One skilled in the art of microbiology can determine the optimum growth conditions for the type of microorganisms used in the biostimulation process. This enables the correct amount and type of nutrients to be added to the contaminated water. In addition, conditions of the treated area, such as the temperature, are preferably controlled to optimize the growth of the microorganisms. Alternatively, in some situations it may be advantageous to allow the process to occur at ambient temperature conditions.

After treatment with nutrients, microorganisms, oxygen, and/or other gases in which the gases are introduced by an aeration system, the treated water is removed to a settling tank to settle out some of the microorganisms as well as other material generated by the biodegradiation process.

In order to maximize the amount of biological activity in the contaminated ground, treated water from the containment area or settling tank is mixed with nutrients and recirculated through the contaminated site 16 by injection into the reinjection trenches 14. If the level of nutrients remaining in the water after treatment is sufficient to stimulate microorganism growth in the ground, it may not be necessary to add more nutrients. Reinjection trenches 14 are positioned proximate the contaminated area depending upon the soil conditions, the direction of natural ground water flow, the location of the spill and extent of contaminated area, so that water injected into the trenches 14 will flow through the contaminated area 16 toward the dewatering trench 10. Thus, the dewatering trench is down gradient and the injection trenches are up gradient from the contaminated ground where the terms down gradient and up gradient indicate the direction of ground water flow.

Figure 3A:
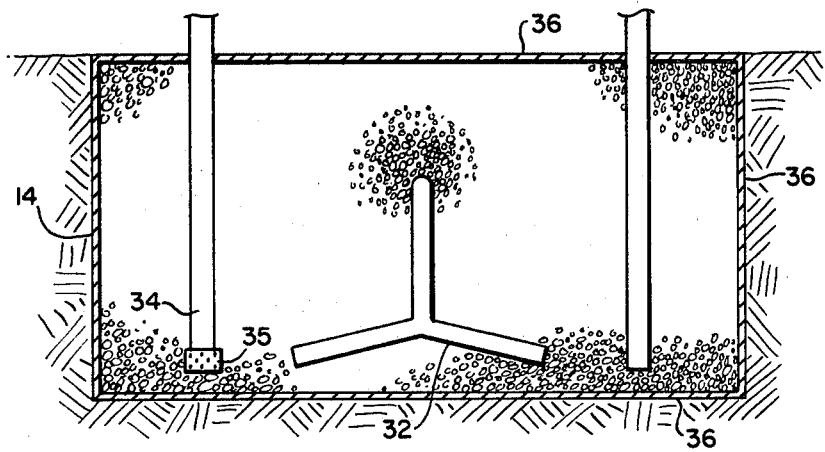
FIG. 3 are front and side cross-sectional views of a reinjection trench.
Figure 3B:
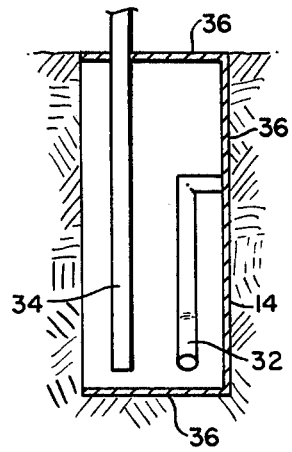

Optimally, the reinjection trenches 14 are constructed as depicted in FIG. 3 so that only the wall of the trench facing the contaminated area 16 is permeable to the water being injected into the trenches 14. The remaining trench walls 36 are constructed so that they are impervious to water, thus directing the treated water being recirculated toward the contaminated area.

The trenches are at least partially filled with gravel and/or stone to maintain a porous well from which the treated water can flow into the surrounding ground. The gravel and/or stone is selected to be of a size which will not readily clog up with the microorganisms in the water and which acts as a trickling filter.

Treated water is reinjected into trenches 14 through a pipe 32 which directs the water to a low level in the trenches. In addition, aeration of the injected water with gases is accomplished by well points 34 which have sparger units 35 at their terminal ends. These well points are attached to an air or gas pumping system of conventional design. Such aeration increases the level of dissolved gases in the treated water and makes it available for use in the biostimulation process.

To effectively treat the contaminated ground, a high degree of biological degradation in situ is possible only if water from the reinjection trenches contacts all of the contaminated ground. In addition, injection of gases throughout the contaminated area is necessary to sustain the degradation process. Gas injection can be performed by locating well points 18 with gas spargers throughout the contaminated area. To ensure that all contaminants are subject to degradation, it is necessary to maintain the elevation of the water level at the land surface in the spill area. Injecting water in trenches up gradient of the spill area at a rate sufficient to maintain the water table at land surface is necessary to fulfill this requirement. The water reinjected into trenches 14 will percolate or flow by natural ground water movement or can be directed by means, such as the directed reinjection trenches and pumping, through the contaminated area 16. If sufficient water is not produced from the treatment tanks to maintain the water table level, additonal water from other sources compatible with the microorganisms is used.

The process of removing water from dewatering trench 10, treating it with nutrients, oxygen, and/or other gases to encourage growth of the microorganisms occuring in the ground and ground water and reintroducing the treated water into the reinjection trenches is continued until the level of hydrocarbon contamination is eliminated or reduced to an acceptable level. Water quality can be continually monitored by sampling from the dewatering trench and in the treatment areas. Thus, appropriate amounts of nutrients can be determined to add to the water being reinjected in the trenches or added to the treatment areas for optimum biodegradation to occur.

As embodied and described in this application, the apparatus for treatment of the hydrocarbon contaminated groundwater comprises means for removing hydrocarbon contaminated groundwater from an area of ground which contains hydrocarbon contamination, the means being capable of extracting substantially all water flowing through said contaminated ground. As embodied herein, the means are one or more trenches positioned at the down gradient end of the contaminated area in such a manner so as to attract substantially all of the water passing through the contaminated ground to the trench. In order to maintain the porosity of the trench and provide what is in effect a depression into which the surrounding ground water drains, the trench is filled with a material such as rock aggregate or stone to maintain an area of low resistance to water flow compared to the surrounding ground. The bottom level of the trench is below the level of the ground which contains the contamination.

Figure 4:
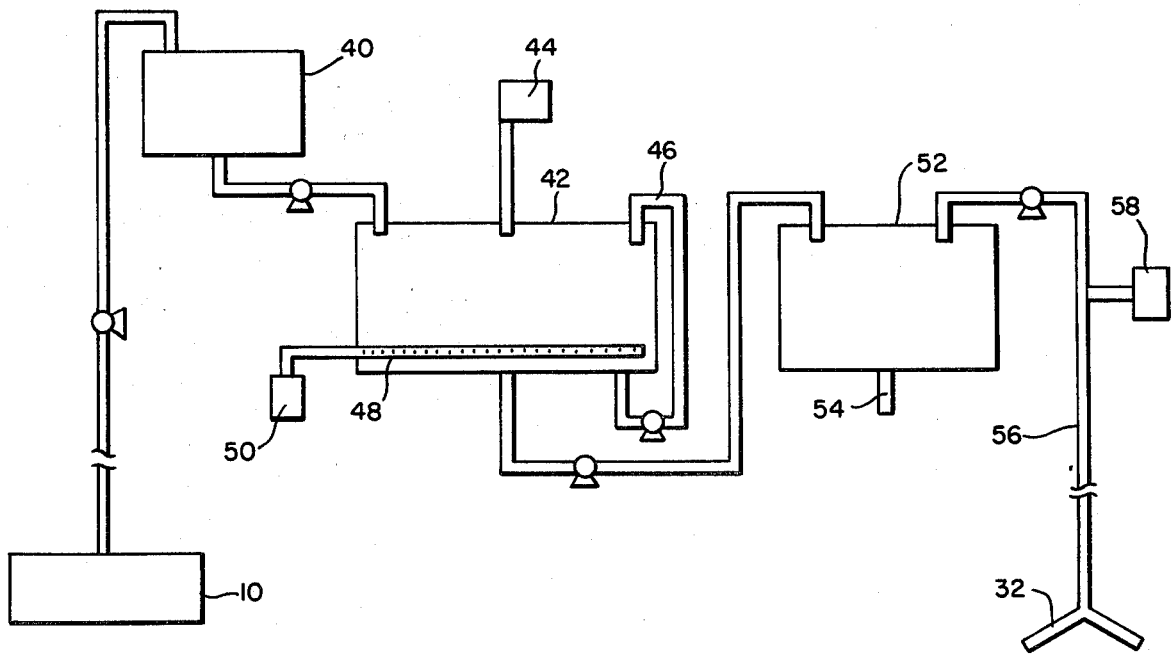
FIG. 4 is a schematic depiction of a flow diagram for the biostimulation treatment of hydrocarbon contaminated water.

The apparatus also has means for treating the removed contaminated water with nutrients and oxygen, and/or other gases to encourage biodegradation. The means as embodied herein comprises a pumping and water handling system to transport the contaminated water from dewatering trench 10 to a holding tank 40 as depicted in FIG. 4. A holding tank is useful in the event that surges in the volume of ground water occur which cannot be accommodated by the treatment tank, but is not essential to the treatment system. The holding tank 40 is connected so that water can flow by pumping action to a biostimulation tank 42. In tank 42, contaminated ground water containing microorganisms capable of biodegrading the contaminating compounds is mixed with nutrients supplied from tank 44. Additional microorganisms from other sources may also be introduced. The nutrients added are chosen to optimize the biodegradation process of the particular hydrocarbon compounds found in the water removed from the contaminated area. The biostimulation tank may have a recirculation system, as depicted by 46, to recirculate the product treated in the tank. The biostimulation tank also has means for aerating the water such as diffusion pipe 48 operatively connected to pump 50 which pumps gases through the diffusion pipe. The diffusion pipe should be designed to aerate the entire tank and to minimize growth of microorganisms on the pipe. This growth would otherwise result in blocking the aeration system.

After the biodegradation process has operated for a sufficient time to decrease the level of contamination, treated water is transferred to settling tank 52 by a pipeline and pump. Settling provides one means for removing the large amounts of microorganisms flourishing in the treatment area as well as any sediment contained in the water. The settled solids are drained off by means of a drain 54 for disposal or recycle. Treated water which normally still contains some microorganisms is removed from the settling tank 52 for recirculation to the reinjection trenches 14 via pumping the water through pipe line 56.

In order to increase the biological activity in the contaminated ground area, means are used to add nutrients to the treated water. In addition, means are used to inject oxygen, generally in the form of air, and/or other gases, into the soil and ground water throughout the contaminated area. The means as embodied herein comprises a nutrient addition tank and injection system 58 which may include an aspirator on the pump connected to the treated water supply line 56 to provide water with high dissolved gases for reinjection. In addition, an aeration mechanism such as a sparger 35 is connected to the reinjection well points 34 in FIG. 3 positioned in reinjection trenches 14 and additional reinjection well points 18, located in the contaminated area, FIG. 1. The treated water is reinjected in trenches 14 through a pipeline entering the trench such as pipe 32.

The apparatus of the invention incorporates means for recirculating the treated water to a position proximate the contaminated area. The position chosen to reintroduce the treated water containing nutrients, microorganisms and gases is situated so that water leaving the reinjection location will flow through the contaminated area toward the removal means. As embodied herein, the means for recirculating the treated water are reinjection trenches 14. These reinjection trenches are dimensioned and positioned according to the size of the contaminated area and the soil conditions in the contaminated area such that water reinjected into the trenches will flow by natural ground water flow conditions and/or by directed flow through the contaminated area toward the dewatering trench 10 which is dimensioned and positioned so that it will receive substantially all of the water flowing through the contaminated site.

In order to demonstrate that the biostimulation process works to reduce the level of hydrocarbon contamination in ground water, experiments were run in a pilot plant. Samples of contaminated ground water were pumped from an area of ground contaminated by hydrocarbon and halogenated hydrocarbon compounds. Ten liter water samples taken from the contaminated area were retained in an activating tank (fermentor) for 18 hours to undergo a biostimulation process with addition of nutrients and air. Air was pumped at 24 psi through aeration systems to aerate the liquid. The treated water was then pumped to a settling tank and finally to an effluent tank.

The following provide examples of the results obtained in the experiments and show that the level of contaminants can be reduced by this process and that the microorganism cultures can be maintained for extended periods of time. Each of the experiments were run for a period of days and terminated while the microorganism culture was still alive. The results given for each example are of one eighteen hour sample during the period. The following abbreviations are used throughout:

COD—chemical oxygen demand
DMA—dimethyl aniline
TSS—total suspended solids
VSS—volatile suspended solids
cfu—colony forming units
MeCl2—methylene chloride
ND—non detectable
BuOH—n butyl alcohol

EXAMPLE 1

9 day run

Aeration System—fritted glass tubes with 10–15 microns holes covering a surface of 95.5 square centimeters.
This covered 23% of the base area of the fermentor.
Air—10.4 liter/min/10 liter

| (mg/liter) | COD | Acetone | MeCl2 | BuOH | PO4 | pH |
|---|---|---|---|---|---|---|
| Start | 6115 | 78 | 4725 | 501 | 106 | 5.8 |
| End | 884 | trace | 597 | 16 | 13 | 7.4 |

Dissolved Oxygen 6.1 mg/liter

| Typical Oxygen | (min) | 0 | 1.5 | 3 | 4.5 | 6 | 7.5 |
|---|---|---|---|---|---|---|---|
| Uptake | (mg/l) | 5.8 | 2.18 | 1.45 | 0.72 | 0.54 | 0 |

Total count >$10^{15}$ cfu/ml
Solids mg/liter TSS 496, VSS 373

EXAMPLE 2

24 day run

Aeration System—Fritted glass tubes
Air—5.8 liter/min/10 liter

| (mg/liter) | COD | MeCl2 | DMA | PO4 | pH |
|---|---|---|---|---|---|
| Start | 297 | 10 | 59 | 12.3 | 6.9 |
| End | 120 | ND | ND | 10.3 | 7.8 |

Dissolved Oxygen 6.4 mg/liter

| Typical Oxygen | (min) | 0 | 10 | 20 | 30 | 40 | 50 | 60 |
|---|---|---|---|---|---|---|---|---|
| Uptake | (mg/l) | 6.4 | 5.6 | 4.5 | 3.5 | 2.5 | 2.0 | 0.7 |

Total count $10^8$ cfu/ml
Solids mg/liter TSS 41, VSS 35

EXAMPLE 3

15 day run

Aeration System—Fritted glass tubes
Air—Dissolved Oxygen 6 liter/min/10 liter
2.9 mg/liter

| (mg/liter) | COD | Acetone | MeCl2 | BuOH | PO4 | pH |
|---|---|---|---|---|---|---|
| Start | 3646 | 66 | 1171 | 1 | 53 | 5.9 |
| End | 477 | 1 | 420 | ND | 8.12 | 8.0 |

| Typical Oxygen | (min) | 0 | 1 | 2 | 3 | 4 | 5 |
|---|---|---|---|---|---|---|---|
| Uptake | (mg/l) | 2.9 | 2.0 | 1.69 | 0.36 | 0.36 | 0.36 |

Solids mg/liter TSS 426 VSS 360

It will be apparent to those skilled in the art that various modifications and various variations can be made in the method and apparatus for the decontamination of ground water without departing from the scope or spirit of the invention. Thus, it is intended that the present invention cover the modifications and variations of this invention provided they come within the scope of the appended claims and their equivalents.

What is claimed is:

1. A method of treating hydrocarbon-contaminated ground water to reduce the level of contamination comprising:

(a) removing ground water from a location proximate to, and down gradient of ground water flow through, an area of ground containing hydrocarbon contamination;

(b) treating the removed ground water with nutrients and gases for a period of time sufficient to reduce the level of hydrocarbon contamination and to enhance the growth of hydrocarbon consuming microorganisms in the removed ground water, said nutrients and gases being suitable for enhancing the growth of hydrocarbon-consuming microorganisms and for reducing the level of contamination; and then;

(c) returning the treated water containing microorganisms, nutrients and gases to the ground at a position upgradient of ground water flow through the contaminated area toward said removal location; and (d) adding gases into the ground of the contaminated area.

2. The method of claim 1 wherein the ground water is removed from and returned to locations comprising trenches dimensioned to substantially isolate said ground water flowing through said contaminated area.

3. The method of claim 1 wherein the removed ground water is treated with nutrients and gases in a containment area, said treated removed ground water being held in said containment area for a period of time and under conditions sufficient to increase the bacteria count in the removed water and to accelerate the biodegradation process.

4. The method of claim 3 wherein ambient conditions are maintained in said containment area.

5. The method of claim 4 wherein the removal and return positions are trenches positioned to substantially isolate the flow of water through the contaminated ground from the surrounding ground.

6. The method of claim 3 wherein the biodegradation process in said containment area is permitted under conditions of temperature to optimize said biodegradation process.

7. The method of claim 1 wherein substantially all ground water flowing through the contaminated area of ground is removed.

8. The method of claim 1 including the step of removing some of the microorganisms and other sediment prior to returning the treated water to the ground.

9. A method of treating an area of ground contaminated by hydrocarbon compounds comprising:
   (a) removing water from a location down gradient of the contaminated ground;
   (b) treating the removed water with gases and nutrients for a period time sufficient to enhance the growth of hydrocarbon-consuming microorganisms and reduce the level of contaminants; and then
   (c) returning the treated water to the ground at a position upgradient of ground water flow through the contaminated ground in an amount sufficient to raise the ground water level in the contaminated area to a level at which all of the contaminated ground is contacted;
   (d) injecting gases into ground water in the contaminated area; and
   (e) allowing said returned and additional water to flow through the contaminated area toward said removal location.

10. The method in claim 1 or 9 wherein the microorganisms used for biodegradation are naturally occuring in the contaminated ground.

11. The method of claim 1 or 9 wherein the microorganisms used for biodegradation are introduced from sources other than those naturally occuring in the contaminated ground.

12. The method of claims 1 or 9 wherein the hydrocarbon contaminate is a halogenated hydrocarbon.

13. The method of claim 1 or 9 wherein said gases are one or more of the group air, oxygen, nitrogen and carbon dioxide.

14. The method of claim 9 wherein additional nutrients are added to the treated water.

15. The method of claim 9 wherein gas is injected into the ground water at locations throughout the contaminated area of ground.

16. The method of claim 9 wherein a sufficient amount of treated water is returned to the ground to raise the level of the ground water to the surface of the contaminated area.

17. The method of claim 16 wherein additional water is added to the ground with the treated water to raise the level of the ground water to the surface.

18. The method of claim 9 wherein additional water is added to the ground with the treated water to raise the level of the ground water to the surface.

19. The method of claim 9 including step of removing some of the microorganisms and other sediment prior to returning the treated water to the ground.

20. Apparatus for treating hydrocarbon-contaminated ground water with microorganisms to cause biodegradation of the hydrocarbon contaminants comprising:
   (a) means for removing hydrocarbon contaminated ground water from an area which is contaminated, said means being capable of extracting substantially all water flowing through said contaminated ground;
   (b) means for treating said removed water with nutrients and gases to increase the biodegradation activity of the microorganisms;
   (c) means for settling solid material from said treated water;
   (d) means for adding nutrients and gases to said treated water;
   (e) means for recirculating the nutrient-laden treated water to a position proximate the contaminated area, said proximate position chosen so that said water will flow through the contaminated area toward the removal means.

21. The apparatus of claim 20 wherein the means for removing hydrocarbon contaminated ground water comprises one or more trenches dimensioned and positioned proximate to said area of contaminated ground, said trenches provided with wells connected to a pumping system for removing water from said trenches.

22. The apparatus of claim 20 wherein the means for treating the removed water comprises an enclosed vessel connected to said means for removing said hydrocarbon contaminated ground water.

23. The apparatus of claim 22 wherein the vessel has a gas distribution system and an opening through which to add nutrients, said gas system capable of aerating the entire volume of the vessel.

24. The apparatus of claim 20 wherein the means for settling solid material comprises a settling tank having a fluid connection to said means for treating.

25. The apparatus of claim 20 wherein the means for adding nutrients to said treated water comprising a nutrient addition tank injection system for nutrients.

26. The apparatus of claim 25 wherein the means for adding gas to the treated water comprises gas sparger units associated with the nutrient injection system.

27. The apparatus of claim 20 wherein the means for recirculating treated water comprises a pumping and piping system to transport water from the settling means to a location proximate to the contaminated area.

28. Apparatus for treating hydrocarbon-contaminated ground water with microorganisms to reduce the level of contamination, comprising:
   (a) means for removing substantially all water which has percolated through an area of ground in which contaminants are present from a location proximate said area;

(b) means for transferring said removed water with hydrocarbon contaminants to a separate treatment area;

(c) means for treating said removed water by addition of nutrients and gas to cause an increased growth of microorganisms capable of biodegrading said hydrocarbon contaminants;

(d) means for settling the treated water;

(e) means for adding nutrients and gases to said treated water;

(f) means for transferring said nutrient-carrying water to a position proximate said contaminated ground such that natural or directed flow of water through said ground will carry said nutrient-carrying water through the area of contaminated ground to the removal means; and (g) means for injecting said treated nutrient-carrying water and gases into the ground at said position.

29. The apparatus for treating hydrocarbon contaminated ground water of claim 20 or 28 wherein the hydrocarbon contaminate is a halogenated hydrocarbon.

30. The apparatus of claim 21 wherein the means for transferring removed water comprises a header connecting the wells in the removal trenches, a pump operatively connected to the header and a pipeline extending from the header to the treatment area.

31. The apparatus of claim 28 wherein the means for injecting the treated water into the ground comprises a trench positioned proximate the contaminated ground, said trench being dimensioned to accommodate the quantity of treated water being returned and having an injection pipe positioned within the trench.

32. The apparatus of claim 28 wherein the means for injecting gas into the ground comprises a gas sparger unit connected to a well point within the injection trench.

* * * * *